United States Patent [19]

Perrott

[11] 4,003,462
[45] Jan. 18, 1977

[54] LOG SORTING SYSTEM

[76] Inventor: Lynn F. Perrott, 15928 NE. Rose Parkway, Portland, Oreg. 97230

[22] Filed: Feb. 6, 1976

[21] Appl. No.: 655,826

[52] U.S. Cl. .............................. 198/369; 198/436; 214/1 P; 214/1 PB; 214/11 R; 209/74 R; 271/64

[51] Int. Cl.² ....................................... B65G 37/00

[58] Field of Search ....... 198/31 R, 31 AA, 31 AC, 198/81, 99; 214/1 P, 1 PB, 6 H, 11 R, 66; 271/64, 184, 225, 245; 209/74 R

[56] References Cited

UNITED STATES PATENTS

| 1,608,930 | 11/1926 | English .................................. 271/64 |
| 2,478,610 | 8/1949 | Uschmann et al. ................... 271/64 |
| 2,573,848 | 11/1951 | Kirchner ............................ 214/11 R |
| 3,193,078 | 7/1965 | Amenta et al. ............... 198/31 AC |
| 3,288,312 | 11/1966 | Hughes et al. .................... 214/11 R |
| 3,828,928 | 8/1974 | Roderick ........................... 209/74 R |
| 3,913,744 | 10/1975 | Turner et al. ..................... 209/74 R |

Primary Examiner—Evon C. Blunk
Assistant Examiner—Joseph E. Valenza
Attorney, Agent, or Firm—Oliver D. Olson

[57] ABSTRACT

Logs to be sorted according to species, grade, length, diameter and a variety of other characteristics and parameters, are delivered one at a time crosswise to the infeed end of an elongated conveyor assembly formed of a plurality of longitudinally aligned, transversely articulated conveyors. A retractable stop is associated with the downstream end of each conveyor for releasable abutment by the logs as they progress along the conveyor assembly. Upon such abutment and subsequent tilting of the conveyor, the log thereon is lowered onto a registering transfer conveyor extending laterally thereof. At the outfeed end of the transfer conveyor the log is directed into a sort rack. When the latter has been filled with a plurality of like logs, they are removed as a group for subsequent processing.

15 Claims, 9 Drawing Figures

LOG SORTING SYSTEM

BACKGROUND OF THE INVENTION

This invention relates to the separation of articles according to predetermined characteristics, and more particularly to a novel system by which logs and like elongated articles may be sorted accordingly to a wide variety of characteristics and parameters.

Although the system of this invention has wide application to the sorting of diverse types of articles, it has particular utility in the sorting of logs. The sorting of logs to achieve the best and most profitable use for each piece is becoming increasingly important as the raw material becomes most costly and complete utilization becomes more essential. Thus, as the availability of the larger diameter old growth timber decreases, the need to utilize the smaller diameter regrowth and second growth material becomes more essential, in order to satisfy the ever increasing demand for pulp, plywood, timbers, lumber and other forest related products. This places upon the industry the many burdens associated with the handling of many more smaller size logs in order to produce the same volume of wood fiber as was available from old growth logs. It has been estimated that the number of logs required for merely maintaining such volume of wood fiber is increasing about 30% per year.

Utilization of such smaller diameter logs necessarily increases the number of parameters for sorting. For example, the sorting yards of some of the larger mill operations require as many as 52 sorts.

The earlier storage and sorting operations in water ponds is economically unfeasible with the present requirement of handling several times the number of logs. The sorting of logs currently is done primarily by the use of dry deck log sorting yards, utilizing front end loaders with special log handling attachments. These loaders off-load the trucks onto scaling decks, chains, or ground sills, where the logs are graded visually according to species, quality amd classification. The logs then are marked and conveyed by chain or front end loader to a crane shovel type machine where the marked logs are sorted and placed into bins or bunks designated to receive them. From these bins or bunks the logs are picked up by front end loaders and taken to storage decks, or directly to the mill for processing.

The foregoing conventional dry deck log sorting yard designed for the mechanical sorting of logs at sufficiently high rates of speed, are extremely expensive, complex installations requiring a sizeable operating crew and a large support force of machines and operators. Accordingly, they are affordable only by the largest corporations. Even so, they present a very hazardous work area for personnel involved in their operation. Moreover, such sorting yards result in excessive log and fiber damage.

SUMMARY OF THE INVENTION

In its basic concept, this invention provides for the sorting of logs and like elongated articles by delivering them one at a time crosswise to the infeed end of a plurality of longitudinally aligned, transversely articulated conveyors each of which is operable selectively to tilt downwardly and discharge an article therefrom for transfer to an associated sort collection station.

It is by virtue of the foregoing basic concept that the principal objective of this invention is achieved; namely, to overcome the aforementioned limitations and disadvantages of prior sorting systems.

Another important object of this invention is the provision of a sorting system in the form of a module and in which any desired number of such modules may be assembled in a linear manner to provide any desired number of sorts.

A further important object of this invention is the provision of a sorting system of the class described in which each modular unit accommodates the sorting of articles into four separate stations.

Still another important object of this invention is the provision of a sorting system for logs and like elongated articles which, by accepting the elongated articles crosswise relative to a conveying assembly, minimizes the space requirements for the system and maximizes the speed of movement of the articles through the system.

A still further important object of this invention is the provision of a sorting system of the class described which includes at each sorting station a sort rack adapted to collect the sorted articles into groups, with maximum speed and minimum damage and affording maximum facility of removal therefrom.

A further important object of this invention is the provision of a sorting system of the class described in which the same handling equipment may be utilized for delivering logs to the infeed end of the conveyor assembly and for removing the groups of sorted logs from the sorting rack, whereby to achieve maximum utilization of such equipment.

Another important object of this invention is the provision of a log sorting system of the class described which, by its modular construction, may be transported over the highway or by rail to job sites and there assembled and placed in operation with minimum time and expense.

The foregoing and other objects and advantages of this invention will appear from the following detailed description, taken in connection with the accompanying drawings of a preferred embodiment.

DESCRIPTION OF THE PREFERRED EMBODIMENT

Figures 1, 6, 9:
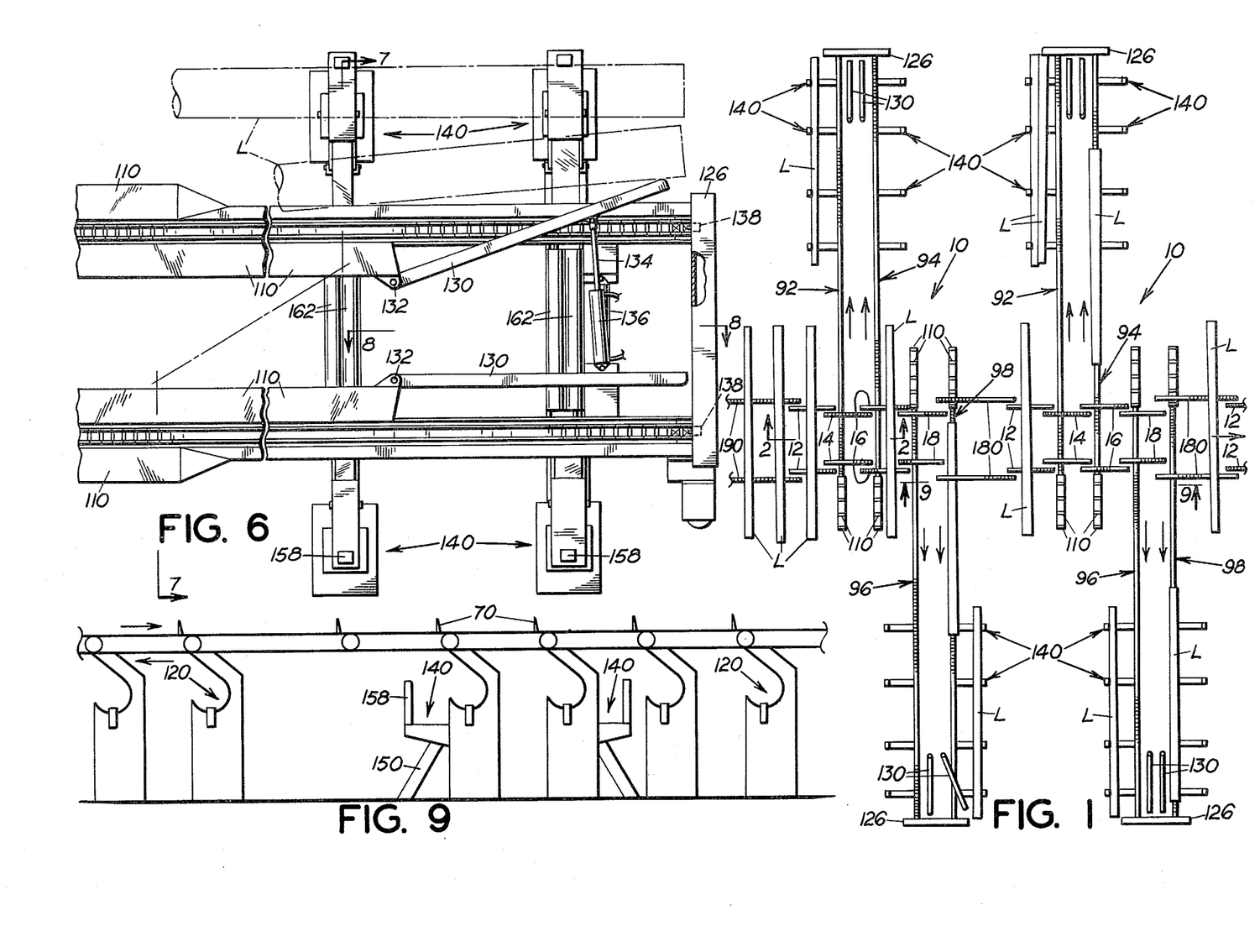
FIG. 1 is a fragmentary plan view of a log sorting system embodying the features of this invention.
FIG. 6 is a fragmentary, foreshortened plan view of the outfeed end of a transfer conveyor of the system of FIG. 1.
FIG. 9 is a fragmentary sectional view taken on the line 9—9 of FIG. 1.

Referring first primarily to FIG. 1 of the drawings, there is illustrated schematically the cooperative association of two identical modules 10 of the sorting system of this invention, arranged for the sorting of logs L.

Each module includes a sorting conveyor assembly formed of four longitudinally aligned conveyors 12, 14, 16 and 18 each formed of a pair of laterally spaced endless conveyor chains 20 (FIG. 2) interconnected by a common drive for simultaneous and identical movement of the working stretches in the outfeed direction.

Figures 2, 5:
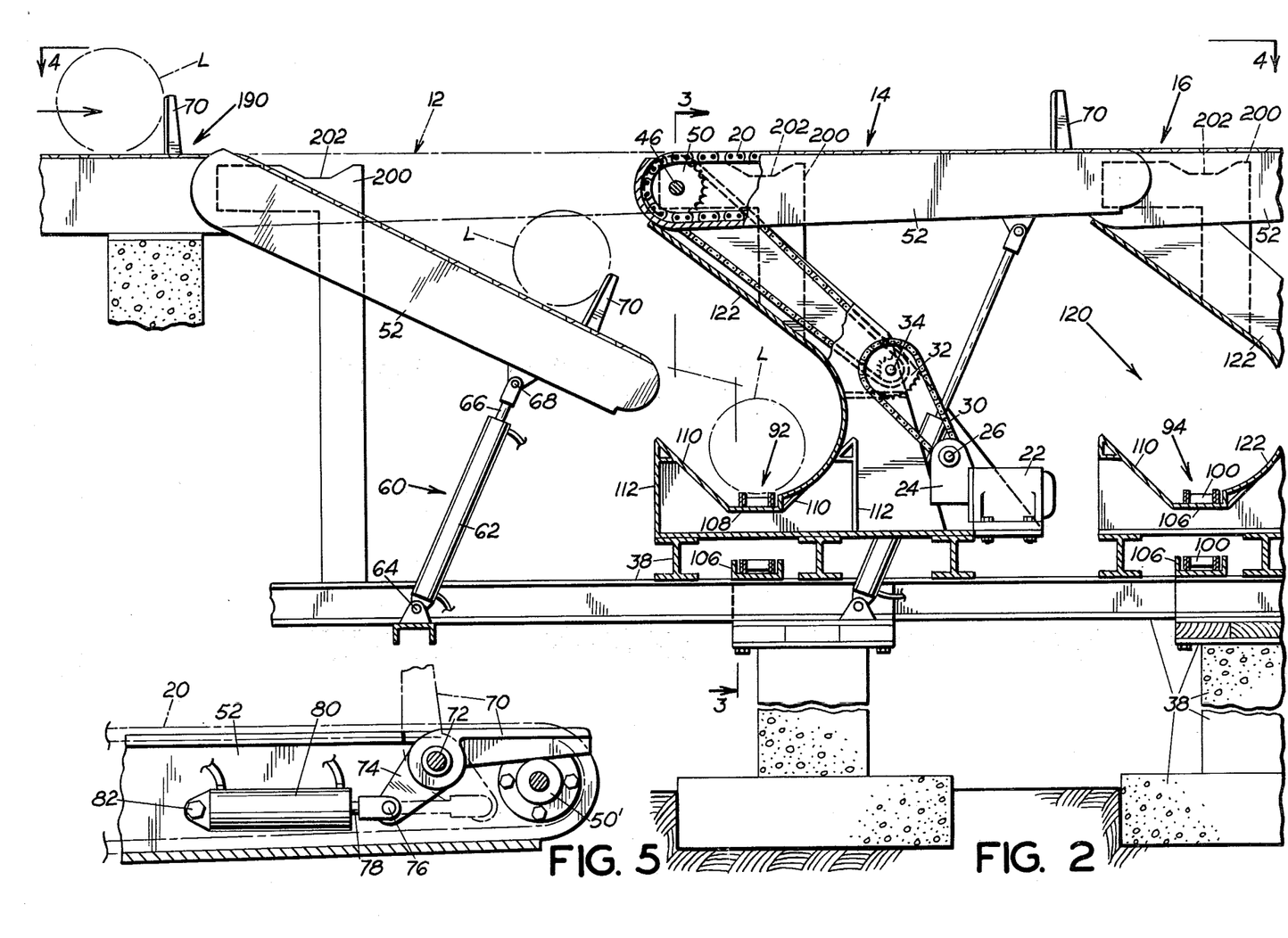
FIG. 2 is a fragmentary, foreshortened sectional view taken on the line 2—2 of FIG. 1.
FIG. 5 is a fragmentary sectional view taken on line 5—5 of FIG. 4.
Figure 3:
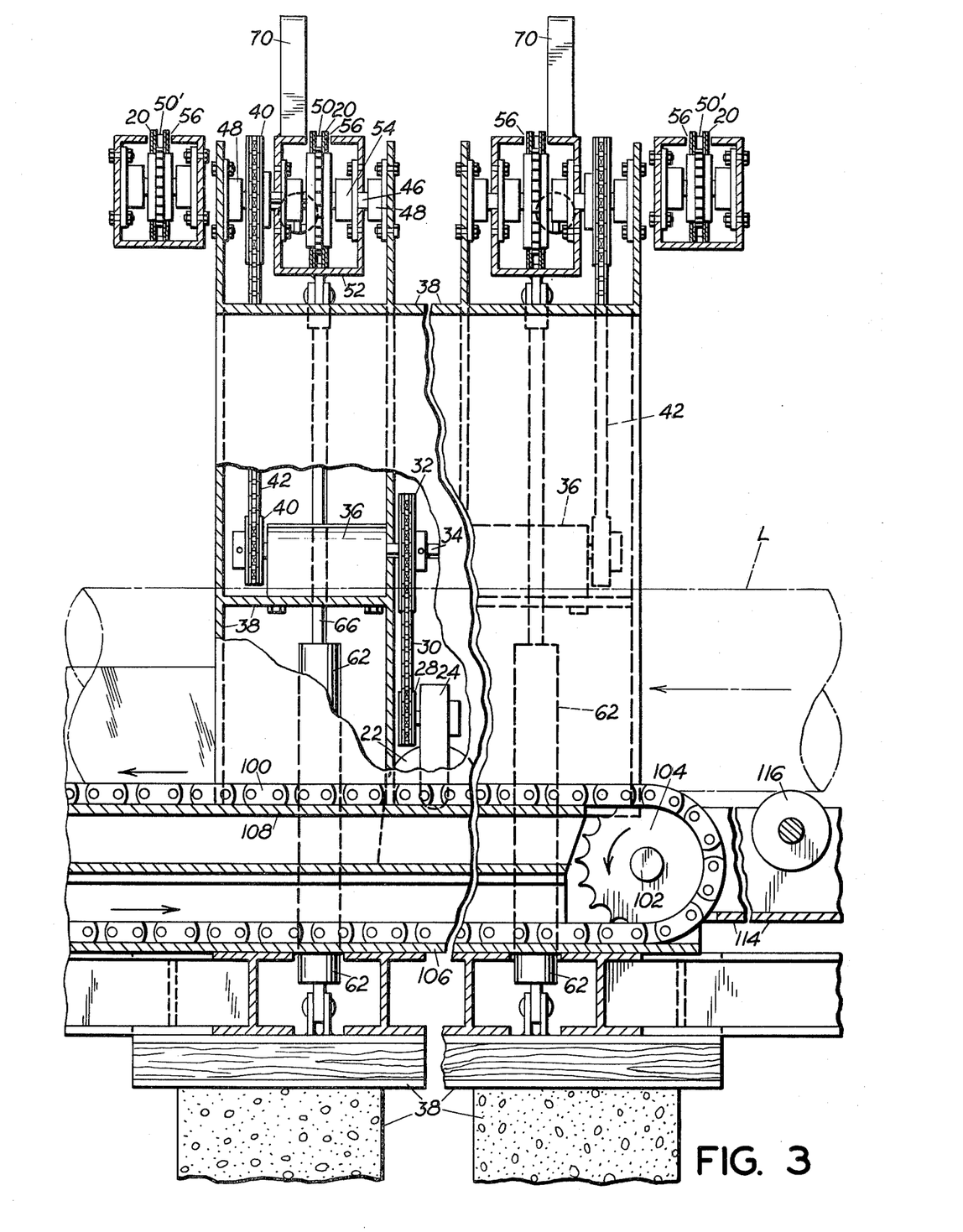
FIG. 3 is a fragmentary, foreshortened sectional view taken on the line 3—3 in FIG. 2.

In the embodiment illustrated, this common drive includes a drive motor 22 (FIG. 2), either electric or hydraulic, coupled to a gear reduction unit 24, the output shaft 26 of which is coupled through a sprocket 28 (FIG. 3) and chain 30 to a sprocket 32 secured to a transverse shaft 34. The shaft 34 is mounted adjacent its opposite ends in bearings 36 supported by components of the frame 38 of the assembly. The opposite ends of the shaft 34 project from the bearings and each mounts a pulley 40 which is coupled through a chain 42 to a pulley 44 mounted on a shaft 46 which is journaled at its opposite ends in bearings 48 supported by upper extensions of the frame 38. The intermediate portion of the shaft 46 mounts a sprocket 50 which supports the upstream end of the sorting conveyor chain 20. The downstream end of the chain is supported by idler sprocket 50' (FIG. 5). The latter is protected throughout its length by an elongated hollow housing 52 which is supported at its upstream end on the shaft 46 by means of bearings 54. A slot 56 is provided along the length of the upper side of the housing through which the upper working stretch of the conveyor chain 20 projects for operative engagement with logs.

Each sorting conveyor chain and housing assembly thus is transversely articulated at its upstream end on shaft 46 for pivotal adjustment between a substantially horizontal, conveying position and a downwardly inclined, discharge position, as illustrated by the downstream and upstream complete conveyors, respectively, in FIG. 2.

Power means is provided for moving each sorting conveyor unit of the assembly between said conveying and discharging positions. In the embodiment illustrated, the power means comprises an elongated fluid pressure piston-cylinder unit 60, preferably pneumatic. As illustrated, one end of the elongated cylinder 62 is connected pivotally, as by pivot pin 64, to a component of the frame 38, while the projecting end of the piston rod 66 is connected pivotally, by a pivot pin 68, to an intermediate point on the conveyor chain housing 52.

In the preferred embodiment illustrated, fluid pressure piston-cylinder unit 60 is provided for each conveyor chain and housing of the pair forming a conveyor unit. For this arrangement it is necessary that the control of pneumatic pressure to the two cylinders be synchronized to insure simultaneous pivotal movement of the spaced housings and associated conveyor chains.

Means is provided on each sorting conveyor unit of the assembly for releasably stopping the forward movement of a log adjacent the downfeed end of the conveyor. In the embodiment illustrated, this is provided by an abutment arm 70 associated with each conveyor chain 20. The arm forms one section of a bell crank lever (FIG. 5). The lever is mounted intermediate its ends on a shaft 72 extending transversely within the housing 52, a portion of the upper wall of the housing being cut away to accommodate the abutment arm. The other section 74 of the bell crank lever extends angularly from the abutment arm section 70 and is connected at its terminal end pivotally, as by a pivot pin 76, to the projecting end of the piston rod 78 associated with the fluid pressure piston-cylinder unit. The cylinder component 80 of the unit is connected pivotally, as by a pivot pin 82, to the housing 52.

Thus, as illustrated in FIG. 5, application of fluid pressure to the cylinder 80 to retract the piston rod 78 effects retraction of the abutment arm 70 to a position below the plane of the working stretch of sorting conveyor chain 20. Conversely, application of fluid pressure to the cylinder to effect extension of the piston rod, results in counterclockwise pivoting of the bell crank lever and consequent elevation of the abutment arm to a vertical position projecting above the conveyor chain, as illustrated in broken lines.

Extension and retraction of the stops 70 may be controlled by the simultaneous activation and deactivation of solenoid operated valves associated one with each cylinder 80 of the piston-cylinder units, as by connecting all of the valve solenoids to a source of electric potential through a cycling switch.

Figure 4:
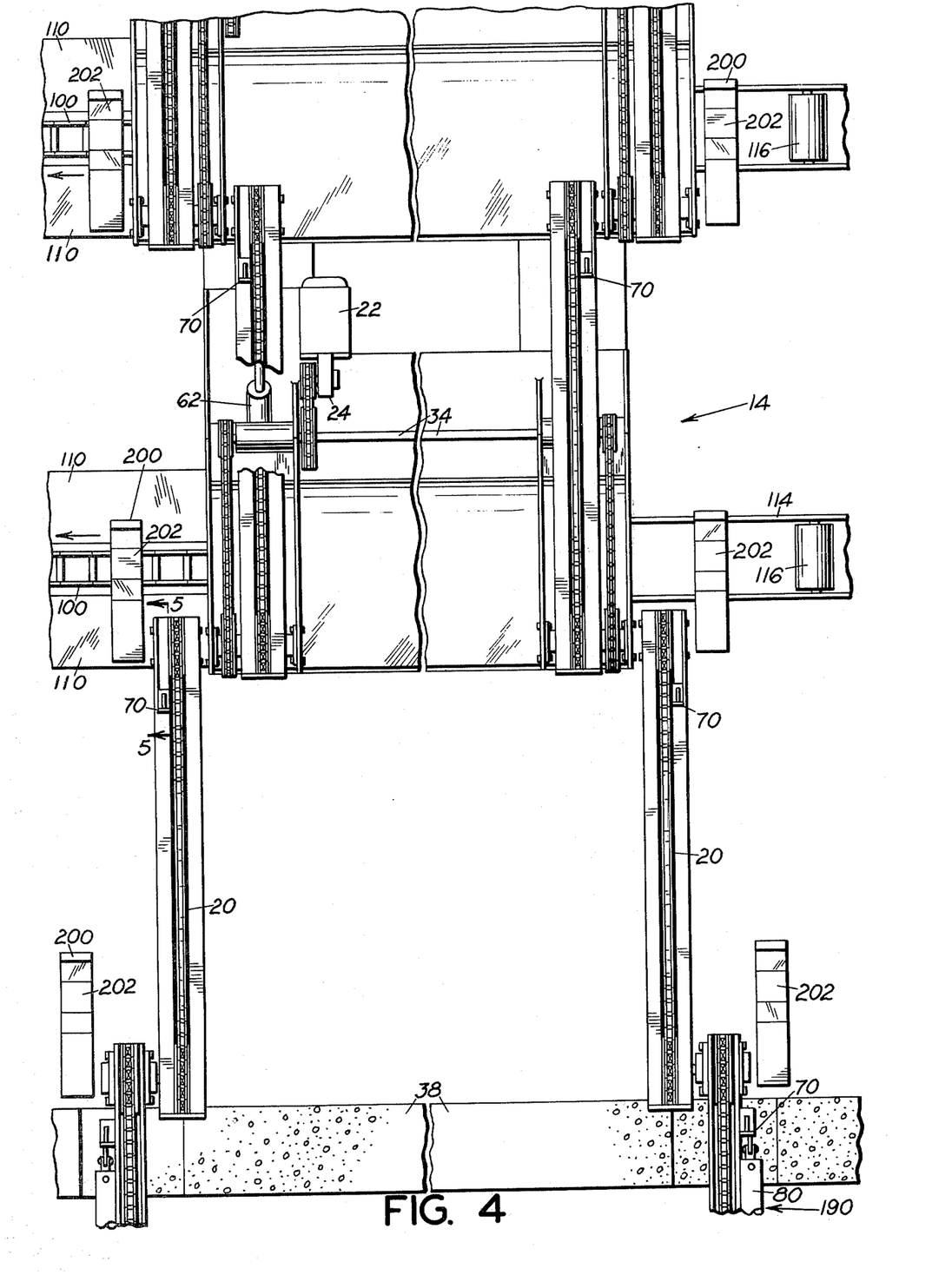
FIG. 4 is a fragmentary, foreshortened plan view as viewed in the direction of arrows 4—4 in FIG. 2.

As illustrated schematically in FIG. 1 and in greater detail in FIG. 4, the adjacent ends of adjacent sorting conveyor units overlap sufficiently to provide continuity of the sorting conveyor assembly. This is achieved in the embodiment illustrated by varying the lateral spacing between the pairs of conveyor chains of each unit. Thus, the pair of conveyor chains and associated housings of the first conveyor chain unit 12 are spaced outwardly of the pair of conveyor chains and housings of the next succeeding conveyor unit 14. The spacing between the conveyor chains and associated housings of the third conveyor unit 16 and fourth conveyor unit 18 correspond to those of the first conveyor unit 12 and second conveyor unit 14, respectively. Alternatively, the spacing between the pairs of conveyor chains 20 of each unit may be made equal, and adjacent units, offset laterally.

The first and second conveyor units 12 and 14 of the sorting conveyor assembly of the module 10 are associated with transfer conveyors 92 and 94, respectively, both of which extend perpendicularly to one side of the longitudinal axis of the sorting conveyor assembly. Similarly, the third and fourth sorting conveyor units 16 and 18 of the module are associated with transfer conveyors 96 and 98, respectively, both of which extend perpendicularly to the opposite side of the longitudinal axis of the sorting conveyor assembly.

Each transfer conveyor comprises an elongated, continuous conveyor chain 100 mounted at its infeed and outfeed ends on sprockets 102 carried by shafts 104 journaled in bearings on components of a log guide, described below, supported by frame 38. One of the shafts is driven by a motor (not shown) for moving the working stretch of the chain in the outfeed direction. As best illustrated in FIG. 2, the slack stretch of the chain 100 slides upon an underlying channel guide 106. The working stretch of the chain slides upon the central flat guide portion 108 of a log guide which includes plates 110 diverging upwardly from portion 108 and braced by plates 112.

Rearwardly of the sprocket 104 at the infeed end of the transfer conveyor chain 100 a framework 114 (FIG. 3) is extended from the log guide to mount a plurality of idler rolls 116 (FIGS. 1 and 3) upon which to support the rearward portion of logs L deposited from the associated sorting conveyor unit.

In the proximity of the downstream end of each associated sorting conveyor unit, there is associated with the working stretch of the transfer conveyor chain 100 a receiving pocket 120 (FIGS. 2 and 9) formed of a backing plate 122 which extends downward from adjacent the upstream end of the next succeeding sorting conveyor unit angularly forward and then arcuately rearward toward the transfer conveyor chain where it is connected to the chain guide portion 108 of the log guide. The adjacent portion of the rearward plate 110 completes the receiving pocket to insure that a log delivered from the associated sorting conveyor unit is properly deposited upon the transfer conveyor.

A transverse abutment 126 (FIGS. 1, 6 and 8) is secured across the outer ends of the log guides of each pair of transfer conveyors, for abutment by the leading ends of logs. At this point means is provided for removing a log on each transfer conveyor to an associated sort rack, described hereinafter, in which to collect those logs which have been sorted according to a predetermined characteristic or parameter.

Thus, in the embodiment illustrated, ejector means at the outfeed end of each transfer conveyor is provided in the form of an ejector arm 130 secured at its inner end by a pivot pin 132 to the terminal end of inner plate 110 of the associated log guide. Intermediate the ends of the arm is pivotally connected the terminal end of the piston rod 134 of a fluid pressure piston-cylinder unit. The opposite end of the cylinder component 136 is connected pivotally to a component of the log guide of the adjacent transfer conveyor. Thus, application of fluid pressure to the cylinder 136 to effect extension of the piston rod, results in pivotal movement of the ejector arm laterally across the associated transfer conveyor. In doing so, the arm abuts the outer end of log on the transfer conveyor and moves it laterally away therefrom toward the sort rack.

Actuation of the piston-cylinder unit preferably is accomplished automatically by abutment of the log against the actuator of an electric switch 138 on the abutment 126, to complete the electric circuit of a solenoid valve associated with the cylinder 136.

In the preferred embodiment illustrated, the sort rack is constructed in such manner as to minimize the distance of fall of a log from the transfer conveyor, whereby to minimize log damage as well as wear and tear on the rack itself. Further, it is constructed to facilitate removal of a group of logs collected in the rack with speed and facility, by use of a conventional front end loader which, as explained hereinbefore, ordinarily is employed in delivering logs to the infeed end of the sorting conveyor assembly.

Each sort rack includes a plurality of laterally spaced elevators 140. Each comprises a pair of laterally spaced side plates 142, a log supporting top plate 144, a front plate 146 and a partial bottom plate 148. The top and bottom plates terminate inwardly of the rearward ends of the side plates, thereby forming an opening for the reception of a guide and support beam 150. The beam extends angularly outward and downward from adjacent the transfer conveyor to a ground-supporting footing. A pair of rollers 152 between the side plates of the elevator are supported for rotation on transverse shafts 154 and are disposed for tracking on opposite side edges of the beam to facilitate reciprocation of the elevator along the beam. An inner plate 156, spaced inwardly from the front plate of the elevator provides a socket in which to receive a vertically elongated stake 158. The arrangement of the stake, elevator top plate 144 and outer surface of the angular beam 150 forms a pocket for the retention of logs received from the transfer conveyor.

Means is provided by which each elevator 140 is movable along the beam 150 from its normal, empty position at the upper end thereof, downward progressively as logs are deposited in the pocket. In the embodiment illustrated, this means is provided by counterweight mechanism in the form of an elongated compression spring 160 confined within an elongated cylindrical housing 162 secured to components of the frame 38 and extending horizontally between adjacent transfer conveyors. A piston 164 within the cylindrical housing abuts the inner end of the coil spring, the outer end of the coil spring abutting the outer end wall 166 of the cylindrical housing about an opening through the latter. A flexible cable 168 is secured at its inner end to the piston 164 and extends freely through the coil spring and opening in end wall 166 of the housing, thence over an idler guide roll 170 mounted on the log guide between the upper and lower stretches of the associated transfer conveyor chain, thence angularly downward for connection of its outer end to the corresponding elevator 140.

Figures 7, 8:
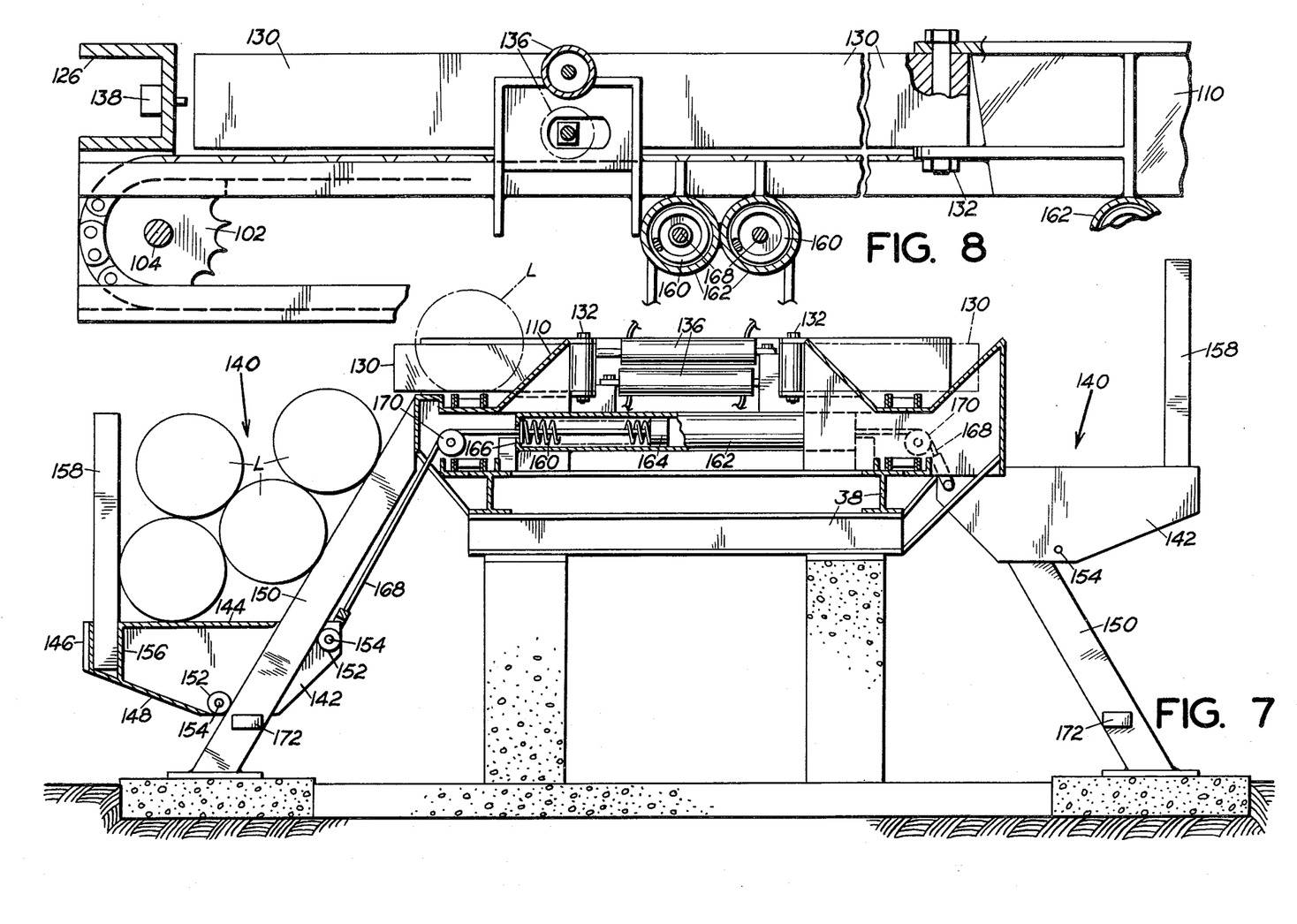
FIG. 7 is a fragmentary sectional view taken on the line 7—7 of FIG. 6.
FIG. 8 is a fragmentary, foreshortened sectional view taken on the line 8—8 of FIG. 6.

The strength of the compression spring 160 is chosen to bring the associated elevator to its upwardmost position when it is empty of logs, as illustrated by the right hand elevator in FIG. 7, and to allow progressive downward movement of the elevator as it becomes filled with logs, as illustrated by the left hand elevator in FIG. 7. By this means each log removed from the outfeed end of the transfer conveyor by the ejector arm 130 falls a minimum distance into the sort rack, thereby minimizing damage to the log.

Further, it is to be noted from FIG. 6 that the operation of the ejector arm results in removal of the log from the transfer conveyor angularly from the leading end of the log to its trailing end. The leading end of the log thus falls downwardly by gravity into the sort rack first, and makes contact with an underlying log or elevator before the trailing portion of the log. This minimizes the impact force of the log on the components of the sort rack and correspondingly minimizes wear and tear on the latter, as well as further minimizing damage to the log.

When a sort rack has become filled with logs, each of the elevators will have been lowered into contact with an underlying abutment 172 projecting from the associated guide beam. With all of the elevators thus lowered uniformly to a predetermined height above ground, the logs spanning the cooperating elevators are displayed horizontally for removal as a unit from the sort rack, conveniently by one of the front end loaders is being employed to deposit logs on the infeed conveyor.

In this latter regard, the space between adjacent laterally extending transfer conveyor pairs of adjacent modules 10 is adjusted to accommodate the movement of such a front end loader. This adjustment is provided by an interconnecting conveyor unit 180 (FIG. 1) of predetermined length communicating the fourth, or farthest downstream articulated conveyor unit 18 of the upstream module 10 with the first, or most upstream articulated conveyor unit 12 of the next succeeding module. The interconnecting conveyor unit 180 preferably is of the same construction as the articulated unit, including the retractable log stops 70, with the exception that it is not articulated.

It is to be noted from FIG. 1 of the drawings that each module 10 includes four articulated sorting conveyor units and two oppositely directed, laterally extended transfer conveyor assemblies each providing a pair of transfer conveyors each of which is associated at its outfeed end with a sort rack. Accordingly, each module is capable of sorting logs to four different characteristics or parameters. The transfer conveyors may be extended from the illustrated sort racks and associated with additional sort racks, to increase sorting capacity.

FIG. 1 further illustrates the versatility of the module 10 in being capable of association with any desired number of additional modules, as required to accommodate any desired number of sorts. For example, 13 modules arranged in linear extension of the articulated sorting conveyor assemblies provides for the sorting of 52 different characteristics and parameters, while utilizing a minimum of ground area and a minimum of time and cost of assembly and operation of the system.

Logs are delivered to the first sorting conveyor unit 12 of the first module 10, one at a time at spaced intervals, by any conventional means, such as an infeed conveyor unit 190. Conveniently, front end loaders may be utilized in the operation of the sorting system and may function to load the infeed conveyor with logs to be sorted and to unload the sort racks as they become filled with sorted logs. In this manner maximum utilization of front end loaders is achieved, with consequent minimization of operating cost.

In the preferred operation of the system described hereinbefore, all of the articulated sorting conveyors and interconnecting conveyors are operated continuously at the same speed, for example 80 feet per minute, and all of the transfer conveyors are operated continuously at about twice the speed of the articulated conveyors. The pair of stops 70 associated with each articulated conveyor unit and each intermediate or bridging conveyor unit 180, is operated simultaneously with all of the other pairs when all of the articulated sorting conveyor units are in elevated position, and they are retracted simultaneously and momentarily on a predetermined intermittent cycle, for example every eight seconds to effect stepwise movement of logs along the sorting conveyor assembly. However, when any one of the articulated conveyor units is tilted downward, as illustrated by the left hand conveyor unit in FIG. 2, the cycling of the stops 70 is interrupted until the tilted conveyor has been returned to its elevated, conveying position.

Each articulated sorting conveyor is tilted downwardly to the log discharge position, independently of all the others, so as to provide for the selective discharge of any log to any one of the transfer conveyors. This is achieved, in the embodiment illustrated, by the control of fluid pressure to each piston-cylinder unit 60, as by means of a conventional solenoid operated valve, the valve of which communicates the opposite ends of the cylinder component 62 of the unit selectively with a source of fluid pressure and the solenoid of which is activated and deactivated selectively as by means of a push button switch in the electric circuit of the solenoid. A control panel (not shown) carrying the plurality of push buttons may be mounted for convenient access to an operator who is located in an elevated position where he can view the movement of logs through the sorting system module.

Upon tilting of an articulated sorting conveyor unit, retraction of the trailing one of the pair of stops 70, i.e. the stop located in the position trailing the other stop of the pair in the direction of movement of the working stretch of the associated transfer conveyor 100, preferably is delayed slightly in time relative to retraction of the leading stop. By this means the leading end of a log is discharged from the tilted conveyor unit first, dropping onto the transfer conveyor, after which the trailing portion of the log follows onto the transfer conveyor. This minimizes damage to the log as well as wear and tear on the component parts of the transfer conveyor.

To further assist depositing the leading end of the log onto the transfer conveyor, the leading articulated conveyor of the pair is allowed to tilt slightly more than the trailing conveyor of the unit. This may be achieved by providing for slightly greater retraction of the piston rod 66 of the leading piston cylinder unit 60, as will be understood.

Having discharged the log from the tilted sorting conveyor, the latter is elevated back to the horizontal, conveying position, by extension of the associated fluid pressure piston-cylinder units. Upon reaching the conveying position, the intermittent, timed sequence of retraction and extension of the stops 70 is initiated and continued until another log on one of the articulated conveyor units is to be discharged to an appropriate transfer conveyor for delivery to the associated sort rack.

As a precaution against inadvertent retraction of the stops 70 on the elevated sorting conveyors 12, 14, 16 and 18 while logs are being transported along them during lowering of one of them to deposit a log onto a transfer conveyor, a pair of laterally spaced frames 200 are provided slightly forward of the infeed end of each sorting conveyor (FIG. 2) and also slightly forward of the outfeed end of the next preceding conveyor. The upper edges of the frames 200 are disposed below the working stretches of the sorting conveyor chains when in elevated position, so as not to interfere with the normal movement of logs along them. A resting pocket 202 is formed in the upper side of each frame 200, adjacent its forward end, to receive therein a log delivered from the next preceding conveyor if the stops 70 associated therewith have inadvertently been lowered. When the conveyor is raised to horizontal position, it elevates the log from the pocket 202 and moves it downstream.

It is to be noted that module 10 is made up of three components; namely, the articulated sorting conveyor assembly, the transfer conveyor assembly and the sorting rack. Each preferably is separable one from another in order to be reduced in dimensions capable of being transported by rail or road to desired job sites. There the components may be assembled into a complete sorting system of any desired size with speed, facility and minimum cost, within a minimum ground area.

It will be apparent to those skilled in the art that various changes may be made in the size, shape, type, number and arrangement of parts described hereinbefore without departing from the spirit of this invention.

Having now described any invention and the manner in which it may be used, I claim:

1. A sorting system for logs and like elongated objects, comprising:

a. a plurality of longitudinally aligned, transversely articulated sorting conveyor means arranged to convey elongated objects disposed crosswise thereof, b. drive means engaging the plurality of sorting conveyor means for moving them in an outfeed direction, c. power means engaging each sorting conveyor means for moving the latter between a conveying position aligned with the other conveyor means and a discharge position tilted downward toward its outfeed end, d. stop means mounted on the outfeed end of each articulated sorting conveyor means movable between an extended position above the conveyor means for abutment by an object thereon and a retracted position out of abutment by an object thereon, e. actuator means engaging the stop means for moving the latter from said retracted position to said extended position when said sorting conveyor means is being tilted to said discharge position, f. a plurality of transfer conveyor means associated one with with each articulated sorting conveyor means and each having an infeed end registering with the sorting conveyor means in the discharge position of the latter, the transfer conveyor means extending laterally of its associated sorting conveyor means, g. drive means engaging the plurality of transfer conveyor means for moving them in an outfeed direction, and h. collector means adjacent the outfeed end of each transfer conveyor means for receiving objects discharged therefrom.

2. The sorting system of claim wherein each sorting conveyor means includes a pair of laterally spaced endless conveyors each provided with power means for independent movement between said conveying and discharge positions.

3. The sorting system of claim 2 wherein the stop means associated with the endless conveyor located downstream relative to the associated transfer conveyor means is operable to retract before the stop means on the associated upstream endless conveyor, whereby to discharge an elongated object onto the transfer conveyor means leading end first.

4. The sorting system of claim 2 wherein the power means associated with the endless conveyor located downstream relative to the associated transfer conveyor means is operable to tilt said endless conveyor farther downward than its associated upstream endless conveyor, whereby to discharge an elongated object onto the transfer conveyor means leading end first.

5. The sorting system of claim 4 wherein the stop means associated with the endless conveyor located downstream relative to the associated transfer conveyor means is operable to retract before the stop means on the associated upstream endless conveyor, whereby to discharge an elongated object onto the transfer conveyor means leading end first.

6. The sorting system of claim 1 including ejector means adjacent the outfeed end of each transfer conveyor means for removing an elongated object from said transfer conveyor means to the collector means.

7. The sorting system of claim 6 wherein the ejector means is arranged to engage the leading end of an elongated object on the transfer conveyor means and to move said leading end to the ejector means before the trailing end thereof.

8. The sorting system of claim 7 wherein the ejector means comprises an elongated arm mounted for pivotal movement about an axis at its trailing end between a retracted position substantially parallel to the transfer conveyor means and an ejecting position extending obliquely across the transfer conveyor means toward the associated collector means.

9. The sorting system of claim 1 wherein the collector means includes a plurality of elevator means spaced apart in the direction parallel to the transfer conveyor means and mounted for movement progressively between an elevated position adjacent the transfer conveyor means and a lowered position above ground level.

10. The sorting system of claim 9 including counterbalancing means engaging each elevator means for moving the latter downward progressively as the elevator means becomes filled with elongated objects discharged from the transfer conveyor means.

11. The sorting system of claim 10 wherein the counterbalancing means comprises an elongated coil spring confined within a housing, a piston within the housing engaging the inner end of the spring, and flexible cable extending from the piston outward through the spring and housing and secured at its outer end to the elevator means.

12. The sorting system of claim 1 comprising a basic module wherein the articulated sorting conveyor means are four in number, the transfer conveyor means are arranged in parallel pairs, one pair extending laterally to one side of the associated sorting conveyor means and a second pair extending laterally to the opposite side of the associated sorting conveyor means.

13. The sorting system of claim 12 wherein a plurality of said modules are coupled together in linear extension of the sorting conveyor means, and including interconnecting, non-articulated conveyor means coupling the outfeed sorting conveyor means of a first module with the infeed sorting conveyor means of the next succeeding module, the interconnecting conveyor means also having stop means adjacent its outfeed end and actuator means for moving the stop means between extended and retracted positions.

14. The sorting system of claim 1 wherein
a. each sorting conveyor means include a pair of laterally spaced, endless conveyors each provided with power means for independent movement between said conveying and discharge positions,
b. ejector is located adjacent the outfeed end of each transfer conveyor means for removing an elongated object from said transfer conveyor means to the collector means, and
c. the collector means includes a plurality of elevator means spaced apart in the direction parallel to the transfer conveyor means and mounted for movement progressively between an elevated position adjacent the transfer conveyor means and a lowered position above ground level.

15. The sorting system of claim 14 wherein
a. the power means associated with the endless conveyor located downstream relative to the associated transfer conveyor means to operable to tilt said endless conveyor farther downward than its associated upstream endless conveyor, whereby to discharge an elongated object onto the transfer conveyor means leading end first,
b. the stop means associated with the endless conveyor located downstream relative to the associated transfer conveyor means is operable to retract before the stop means on the associated upstream endless conveyor, whereby to discharge an elongated object onto the transfer conveyor means leading end first, c. the ejector means is arranged to engage the leading end of an elongated object on the transfer conveyor means and to move said leading end to the collector means before the trailing end thereof, and d. counterbalancing means engages each elevator means for moving the latter downward progressively as the elevator means becomes filled with elongated objects discharged from the transfer conveyor means.

* * * * *